(12) United States Patent
Allen

(10) Patent No.: US 6,383,677 B1
(45) Date of Patent: May 7, 2002

(54) FUEL CELL CURRENT COLLECTOR

(75) Inventor: Jeffrey Peter Allen, Naugatuck, CT (US)

(73) Assignee: Allen Engineering Company, Inc., Naugatuck, CT (US)

( * ) Notice: Subject to any disclaimer, the term of this patent is extended or adjusted under 35 U.S.C. 154(b) by 0 days.

(21) Appl. No.: 09/413,169

(22) Filed: Oct. 7, 1999

(51) Int. Cl.[7] .................. H01M 8/04; H01M 8/10; H01M 2/26
(52) U.S. Cl. .................. 429/34; 429/12; 429/13; 429/36; 429/38; 429/39
(58) Field of Search .................. 429/12, 13, 34, 429/36, 38, 39

(56) References Cited

U.S. PATENT DOCUMENTS

| | | | |
|---|---|---|---|
| 4,169,917 A | 10/1979 | Baker et al. | 429/26 |
| 4,175,165 A | 11/1979 | Adlhart | 429/30 |
| 4,476,197 A | 10/1984 | Herceg | 429/32 |
| 4,510,212 A | 4/1985 | Fraioli | 429/30 |
| 4,548,876 A | 10/1985 | Bregoli | 429/38 |
| 4,604,331 A | 8/1986 | Louis | 429/35 |
| 4,631,239 A | 12/1986 | Spurrier et al. | 429/39 |
| 4,702,973 A | 10/1987 | Marianowski | 429/41 |
| 4,753,857 A | 6/1988 | Hosaka | 429/38 |
| 4,781,996 A | 11/1988 | Toriya et al. | 429/36 |
| 4,853,301 A | 8/1989 | Granata, Jr. et al. | 429/39 |
| 4,855,193 A * | 8/1989 | McElroy | 429/30 |
| 4,857,420 A | 8/1989 | Maricle et al. | 429/30 |
| 4,977,041 A | 12/1990 | Shiozawa et al. | 429/26 |
| 4,978,589 A | 12/1990 | Shiozawa et al. | 429/26 |
| 4,983,472 A | 1/1991 | Katz et al. | 429/38 |
| 5,084,364 A | 1/1992 | Quaadvliet | 429/34 |
| 5,227,256 A | 7/1993 | Marianowski et al. | 429/16 |
| 5,298,342 A | 3/1994 | Laurens et al. | 429/35 |
| 5,362,578 A | 11/1994 | Petri et al. | 429/35 |
| 5,424,144 A | 6/1995 | Woods, Jr. | 429/35 |
| 5,460,897 A | 10/1995 | Gibson et al. | 429/39 |
| 5,482,792 A | 1/1996 | Faita et al. | 429/30 |
| 5,503,945 A | 4/1996 | Petri et al. | 429/35 |
| 5,527,363 A | 6/1996 | Wilkinson et al. | 29/623.1 |
| 5,558,955 A | 9/1996 | Breault et al. | 429/38 |
| 5,707,755 A | 1/1998 | Grot | 429/40 |
| 5,726,105 A | 3/1998 | Grasso et al. | 442/326 |
| 5,733,682 A | 3/1998 | Quadakkers et al. | 429/210 |
| 5,770,327 A | 6/1998 | Barnett et al. | 429/32 |
| 5,773,160 A | 6/1998 | Wilkinson et al. | 429/13 |
| 5,773,161 A | 6/1998 | Farooque et al. | 429/34 |
| 5,776,624 A | 7/1998 | Nuetzler | 429/26 |
| 5,795,665 A | 8/1998 | Allen | 429/12 |
| 5,798,187 A | 8/1998 | Wilson et al. | 429/26 |
| 5,798,188 A | 8/1998 | Mukohyama et al. | 429/34 |
| 5,811,202 A | 9/1998 | Petraglia | 429/35 |
| 5,833,822 A | 11/1998 | Hsu | 204/270 |

(List continued on next page.)

FOREIGN PATENT DOCUMENTS

| | | | |
|---|---|---|---|
| JP | 61 024 158 | 2/1986 | |
| JP | 07022038 | * 1/1995 | H01M/8/02 |
| WO | WO 98/21773 | 5/1998 | |

OTHER PUBLICATIONS

Abstract of Japanese Patent No. JP 07 022 038, published Jan. 24, 1995, *Patent Abstracts of Japan.*

Primary Examiner—Carol Chaney
Assistant Examiner—Dah-Wei Yuan
(74) Attorney, Agent, or Firm—Banner & Witcoff, Ltd.

(57) ABSTRACT

A fuel cell is fitted with a current collector situated between a ribbed separator and an electrode. The current collector is comprised of a plurality of flat wires which span the peaks of the ribs of the separator. The flat wires are of sufficient thickness, width, and frequency to support the electrode against the compressive load of the fuel cell stack. The width and frequency are alterable to suppress or enhance reactant access to the electrode.

27 Claims, 5 Drawing Sheets

U.S. PATENT DOCUMENTS

| | | | |
|---|---|---|---|
| 5,846,668 A | 12/1998 | Watanabe | 429/32 |
| 5,922,485 A | 7/1999 | Enami | 429/26 |
| 5,942,349 A | 8/1999 | Badwal et al. | 429/34 |
| 6,033,794 A | 3/2000 | George et al. | 429/24 |
| 6,037,073 A | 3/2000 | Besmann et al. | 429/34 |
| 6,040,073 A | 3/2000 | Okamoto | 429/26 |
| 6,040,075 A | 3/2000 | Adcock et al. | 429/32 |
| 6,040,076 A | 3/2000 | Reeder | 429/35 |
| 6,045,934 A | 4/2000 | Enami | 429/30 |
| 6,045,935 A | 4/2000 | Ketcham et al. | 429/30 |
| 6,048,633 A | 4/2000 | Fujii et al. | 429/32 |
| 6,048,634 A | 4/2000 | Kaufman et al. | 429/34 |
| 6,048,636 A | 4/2000 | Naoumidis et al. | 429/44 |
| 6,050,331 A | 4/2000 | Breault et al. | 165/168 |
| 6,051,330 A | 4/2000 | Fasano et al. | 429/30 |
| 6,051,331 A | 4/2000 | Spear, Jr. et al. | 429/34 |
| 6,054,228 A | 4/2000 | Cisar et al. | 429/18 |
| 6,054,231 A | 4/2000 | Virkar et al. | 429/34 |
| 6,071,635 A | 6/2000 | Carlstrom, Jr. | 429/34 |
| 6,071,636 A | 6/2000 | Mosdale | 429/34 |
| 6,074,692 A | 6/2000 | Hulett | 427/115 |
| 6,080,502 A | 6/2000 | Nölscher et al. | 429/34 |
| 6,096,450 A | 8/2000 | Walsh | 429/34 |
| 6,099,984 A | 8/2000 | Rock | 429/39 |
| 6,103,415 A | 8/2000 | Kurita et al. | 429/34 |
| 6,117,580 A | 9/2000 | Nitschké | 429/34 |

\* cited by examiner

FUEL CELL CURRENT COLLECTOR

CROSS-REFERENCE TO RELATED APPLICATIONS

Not Applicable

STATEMENT REGARDING FEDERALLY SPONSORED RESEARCH OR DEVELOPMENT

Not Applicable

REFERANCE TO A MICROFICHE APPENDIX

Not Applicable

BACKGROUND OF THE INVENTION

1. Field of the Invention

Embodiments of the present invention relate generally to fuel cells which utilize a current collector and/or a separator for the purpose of providing an electronic flow path for current generated by the fuel cell, to support the electrodes and electrolyte holding member, and to form the flow field for gas access to electrodes.

2. Description of Related Art

Conventional planar fuel cell stacks typically are comprised of a plurality of fuel cell subassemblies arranged in an electrical series relationship. Each fuel cell sub-assembly may be comprised of an anode electrode, a separator plate, and a cathode electrode. Each electrolyte holding member is located between adjacent fuel cell sub-assemblies so as to be in contact with the anode and the cathode of adjoining fuel cell sub-assemblies. Another approach is to provide a plurality of membrane-electrode assemblies, or MEA's, with the separators located between adjacent MEA's. At assembly, the fuel cell stack is compressed axially to afford good intimate contact at each interface of the fuel cell stack to establish the electronic flow path for the electrons liberated by the electrochemical fuel cell reaction.

The separator plate, being disposed between adjacent anodes and cathodes, is required to be constructed from a conductive material. Typically, the basis for selection of material to construct the separator is a function of the operating characteristics of the fuel cell type. Each of the various fuel cell types has its particular electrolyte and operating temperature and provides various degrees of operating efficiencies. Typically, fuel cells which operate at low temperatures ( ~<400 C.) may utilize a polymer separated carbon graphite for the separator material. Fuel cells which operate at temperatures greater than ~400 C. utilize stainless steels and ceramics as the separator material.

The separator plate of a conventional high temperature fuel cell stack serves multiple purposes.

The separator acts as a housing for the reactant gasses to avoid leakage to atmosphere and cross-contamination of the reactants.

The separator acts as a flow field for the reactant gasses to allow access to the reaction sites at the electrode/electrolyte interfaces.

The separator further acts as a current collector for the electronic flow path of the series connected fuel cells.

In many cases the separator is comprised of multiple components to achieve these purposes. Typically, three to four separate components, or sheets of material, are needed depending upon the flow configuration of the fuel cell stack. It is frequently seen that one sheet of material is used to provide the separation of anode/cathode gasses while two additional sheets are used to provide the flow field and current collection duties for the anode and the cathode sides of the separator. Another example of prior art is to use one sheet of ribbed or dimpled material to create the anode/cathode separation as well as the flow fields. Additional sheets of perforated material are used for current collection and, in some instances, to enhance the flow field cross sectional area.

There are three fundamental flow patterns of the reactant gasses which may be applied to the separator to achieve varying objectives. The three patterns consist of co-flow, counter-flow, and cross-flow. Each of the three flow patterns introduces varying degrees of complexity to the design and construction of the separator and current collectors. Low temperature fuel cells, employing carbon graphite as the separator material, often will utilize a combination of the three fundamental flow patterns resulting in sinusoidal flow paths or "Z" patterns.

U.S. Pat. No. 4,548,876 teaches the application of a "corrugated metallic electron collector" which "includes a plurality of corrugations therein". A preferred embodiment described in this patent utilizes particles within the metallic electron collector to "provide support for a respective catalyst (i.e. electrode) immediately adjacent to and in contact with the metallic electron collector". These collectors are adjacent to flat "separators".

This approach has been further advanced through the application of an additional sheet metal component comprised of a perforated sheet positioned between the "corrugated metallic electron collector" and the respective electrode. These approaches have proved to be technically feasible, however, the material content of such structures is economically prohibitive, consisting of three to five sheet metal components of rather significant complexity.

U.S. Pat. Nos. 4,654,195 and 5,531,956 among others teaches the application of "ribs" to the anode electrode of the fuel cell. This approach is intended to apply the flow field directly to the electrode. While technically effective, typically the material cost of the anode is greater than that of sheet metal used to otherwise form an anode flow field with the current collector and separator. Additionally, depth of the ribs formed on the anodes is insufficient for large area fuel cells requiring large cross-sectional flow area. Furthermore, excessive mechanical creep of ribbed anodes can result in poor performance of the fuel cell.

U.S. Pat. No. 4,983,472 teaches the application of a "plurality of arches" to the current collector in a somewhat similar fashion as the above mentioned U.S. Pat. No. 4,548,876. However, the plurality of arches are distributed much more densely and create a finer degree of support to the electrodes thus eliminating the requirement for supporting particles or an additional perforated sheet metal component. This approach has proven to be technically successful but yet again has not reduced the component count of the separator plate below three sheets of material, two current collectors and one separator sheet.

U.S. Pat. No. 5,503,945 teaches the application of corrugations to the "main plate" of the separator and the use of perforated current collector for both the anode and cathode. This patent further teaches the integration of the current collector with its respective electrode. Additionally, this patent teaches the integration of the current collector of either the anode or the cathode with the peripheral sealing structure of the separator and claims a two piece separator with reduced material content and component count. However, the requirement for a current collector for the anode and for the cathode have not been eliminated. The active central area of the fuel cell typically constitutes the far greater portion of the area of the fuel cell relative to the peripheral sealing area. Therefore, while component count of the separator assembly has been reduced through integration of one of the current collectors with either the anode or with the cathode, the material content and component count of the separator as a whole has not appreciably been altered when viewing the total assembly. Furthermore, current collector/separator designs which utilize a ribbed separator and a nominally flat perforated current collector suffer from diminished cross-communication of the reactant gas from one rib to adjoining ribs.

U.S. Pat. No. 5,795,665 teaches the application of "a plurality of rows of dimples" to the separator plate and to the "current collector/active component subassembly". Though resulting in modest reduction of material content the separator/current collector component count remains at three. This invention provides for cross-flow, co-flow, or counter-flow of reactant gasses utilizing three sheets of material.

U.S. Pat. No. 5,811,202 teaches the application of ribs to an "anode field plate" and to a "cathode field plate" separated by a "flat middle plate". A perforated current collector is disposed between the cathode field plate and the cathode electrode throughout the central active area of the fuel cell. Again, as with the above mentioned U.S. Pat. No. 5,503,945, the active central area of the fuel cell typically constitutes the far greater portion of the area of the fuel cell relative to the peripheral sealing area. Therefore, while component count of the separator assembly has been stated as being three, the component count of the separator as a whole when viewing the total assembly is four.

Material content of the separator/current collector assembly tends to be a function of two factors: the size of the active area of the fuel cell and the efficient use of structural forming materials. Fuel cells with areas exceeding about one square foot and operating at or near atmospheric pressures require reactant flow fields (i.e. anode and cathode) with sufficient cross-sectional area to prevent excessive pressure build-up at the inlets. Excessive pressure at the inlets relative to the outlets can create undesirable pressure differentials that may contribute to leakage of the reactants. As such, as cell area, and consequently flow field length, is increased to provide ever greater quantities of power output the cross-sectional area of the reactant flow fields also must increase. As it is the material of construction of the separator which forms the flow fields, material content of the separator rises with the increase in cross-sectional flow area. Excessive material content can be controlled with efficient use of the structural forming materials and the limitation of flow field length.

Material thickness of the various current collector designs is governed by several factors which include corrosion rates of the various fuel cell environments as well as the mechanical constraints induced by the axial compressive load applied to the fuel cell stack and the unsupported spans of the flow field induced by the desire to maximize the cross-sectional flow area. As mentioned above, as cell area increases the cross-sectional flow area also is increased to accommodate the added reactant gas flow rate and associated back pressure. As a result fuel cells which seek large areas and/or operate at atmospheric pressures must provide relatively large cross-sectional flow area which tends to manifest in wide unsupported spans requiring robust current collector design.

In some instances it has been found necessary to electroplate a stainless steel alloy with nickel for corrosion protection in anode current collector applications. Nickel is very stable in the anode environment of the molten carbonate fuel cell but does not retain the same degree of strength at operating temperatures as certain stainless steel alloys. When the current collector is configured to provide high degrees of structure to the flow field, as with U.S. Pat. No. 4,983,472, a high strength alloy may be utilized to produce the anode current collector and typically is nickel plated following the forming process. Nickel plating adds significant expense to the manufactured cost of the current collector.

All of the above described prior art utilizes perforated sheet metal in one form or another to create the current collector of the fuel cell. These perforations are arranged in highly repetitive patterns to simplify manufacture as well as to maximize the access of the reactant gasses to the electrodes. The degree of reactant access to the electrode is often referred to as "percent open area" of the current collector. A reasonably large percent open area is needed to avoid choking the fuel cell electrochemical reaction which diminishes performance. However, large percentage of open area alone neglects the electrodes requirement for physical support against the stack axial compressive load. A compromise is made to limit percentage of open area while maintaining appropriately dispersed electrode support.

For example, molten carbonate fuel cell electrodes can sustain only modest widths of open and unsupported area of approximately 0.10 inches. Additionally, the performance of molten carbonate fuel cells is diminished if the width of the areas of the current collector supporting the electrode exceeds approximately 0.10 inches. As a result the typical MCFC current collector pattern of perforated openings has a pitch in at least one axis of approximately 0.20 inches. These factors become more restrictive as electrode thickness is reduced.

However, it has been observed that the electrodes are able to sustain considerable lengths of narrow unsupported areas. For example, the pattern described in the above mentioned U.S. Pat. No. 4,983,472 patent where, although the width of the typical opening is held at 0.06", the length of the opening is 0.190". Another example is the description in the above mentioned U.S. Pat. No. 5,811,202 patent which implies that the anode is supported only by a ribbed flow field implying significant lengths of narrow unsupported area.

In some instances, as with the current collector described in U.S. Pat. No. 4,983,472, the perforations are partial and the otherwise scrap metal is utilized to form the structure of the cross-sectional flow area. As such, the manufacture of these various current collector designs typically requires specialized tooling operated in press machines of varying degrees of complexity. In current collector patterns where the perforation is total and a through hole is produced a large quantity of scrap metal is generated during the manufacturing process, up to 35–40%. The complexity of the tooling and the generation of large quantity of scrap conspire to render the various designs as uneconomical at high production volume anticipated for commercial fuel cell applications.

As mentioned, the typical highly repetitive patterns are intended to maximize gas access to electrodes for optimum fuel cell performance. However, the various flow patterns of the separator and the vagaries of the electrochemical fuel cell process often result in undesirable concentrations of electrochemical reactions. This tends to create hot spots and cold spots, or thermal gradients, in the fuel cell which can contribute to premature failure of the fuel cell. It is well established in the art that counter-flow of reactant gasses in general provides the optimum distribution of the electrochemical fuel cell process and results in good current density distribution and reduced thermal gradients. In such a counter-flow approach the fuel stream in each cell is initially directed to a region of the anode layer which coincides with the region of the adjoining cathode layer in which the oxidant stream has the lowest concentration of oxygen. As the fuel stream progresses through the fuel cell and approaches the exit it has been depleted of fuel and now coincides with the region of the cathode in which the oxidant stream has the highest concentration of oxygen. It is further well established in the art that co-flow and cross-flow of reactant gasses provide for a less optimum current density distribution and thermal gradients. It is additionally well established in the art that the current collector of a fuel cell is capable of diminishing the performance of the fuel cell if the current collector shields excessive areas of the electrodes from the reactant gases.

BRIEF SUMMARY OF THE INVENTION

It is an object of this invention to provide a plurality of flat wires to act as the current collector for a fuel cell which utilizes a ribbed separator to form the flow fields.

It is a further object of the present invention to provide a current collector for a fuel cell with long lengths of areas of alternately narrowly supported and narrowly unsupported electrodes.

It is a further object of the present invention to provide a current collector for a fuel cell with lateral conduits for fluid communication between adjoining flow ribs of the separator.

It is a further object of this invention to provide a current collector for a fuel cell which is simple to manufacture with little or no scrap material generated during the manufacturing process.

It is a further object of the present invention to provide a current collector that does not require electroplating of corrosion resistant coatings.

It is yet a further object of the present invention to provide a current collector for a fuel cell such that the manufacturing tools may be easily modified or adjusted to alter the current collector pattern to selectively concentrate or disperse the fuel cell electrochemical reaction to desirable locations to optimize fuel cell performance.

The preferred embodiment of the invention utilizes a plurality of parallel flat wires slit continuously from sheet metal and bonded to the face of an electrode on the side facing the respective flow field of the separator. The separator is formed with ribs. The flat wires, or strips, are preferably narrow and are preferably spaced at sufficient frequency, or pitch, as to provide optimum access of the reactant gasses to the electrodes as well as to provide optimum mechanical support to the electrodes. The flat wires are preferably thin as to minimize material content and ease manufacturing constraints yet retain sufficient strength to react against the compressive sealing forces applied to the fuel cell stack at assembly.

The flat wire current collectors are preferably continuously and simultaneously slit from sheet metal using a powered rotary slitting device and spread apart to the desired spacing through a combing device prior to an adhesive bonding to a preferably continuously tape cast electrode. The current collector/electrode assembly may then be cut to desired length for installation to the ribbed separator.

The flat wires will span the peaks of the ribs of the separator and may be arranged at any significant angle, other than parallel, to the ribs of the separator that effectively supports the flat wire. Consequently, a secondary lateral conduit is created in the spaces between the flat wires which provides lateral fluid communication of the primary flow field conduit of the flow ribs for improved balancing of pressures and compositions of the reactant gasses.

Upon viewing the figures and reading the detailed description it will be apparent to those skilled in the art that the current collector herein described will be of low material content, produced with little or no scrap, provide ease of manufacture, will not require corrosion resistant coatings, and may be easily manipulated to selectively concentrate or disperse the fuel cell electrochemical reaction to desirable locations for optimized fuel cell performance.

BRIEF DESCRIPTION OF THE SEVERAL VIEWS OF THE DRAWING

The above and other aspects of the invention will become more apparent upon reading the following detailed description in conjunction with the accompanying drawings, in which.

DETAILED DESCRIPTION OF THE INVENTION

Figure 1:
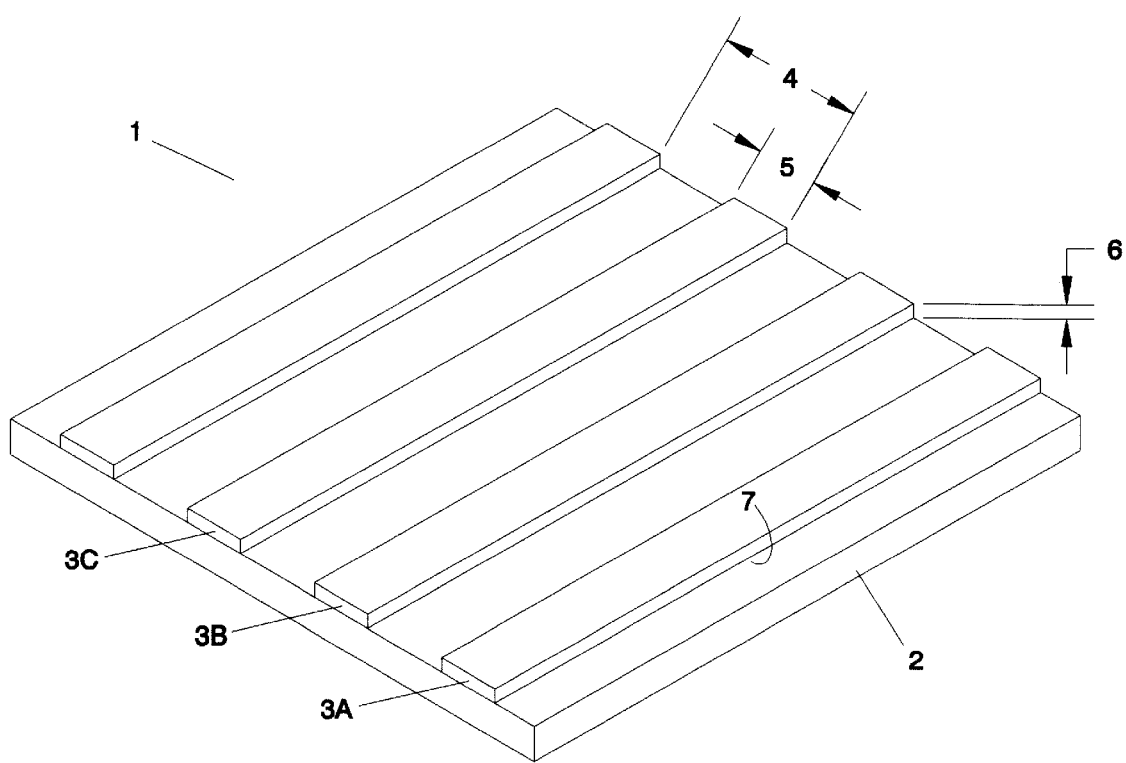
FIG. 1 illustrates a portion of the central active area of the current collector/electrode sub-assembly.

In FIG. 1, a current collector/electrode sub-assembly 1 is shown. As illustrated, the sub-assembly includes an electrode 2 and a plurality of flat wires 3A, 3B, 3C, . . . which extend across the surface of electrode 2. The flat wires 3A, 3B, 3C, . . . are set at a pitch equivalent to 4, possess a width equivalent to 5, and possess a thickness equivalent to 6. An adhesive 7 is applied to one surface of flat wires 3A, 3B, 3C . . . for the purpose of bonding to the electrode 2. The adhesive 7 is comprised of any of the adhesives known to those skilled in the art which may be removed following stack assembly by means of oxidation at elevated temperature. The composition of the flat wires 3A, 3B, 3C, . . . should consist of elements, or alloys of elements, known to remain stable in the fuel cell type to which they are to be installed. For example, a molten carbonate fuel cell (MCFC) may utilize alloy 316 SS for the cathode flat wire and Nickel 200/201 for the anode flat wire. Experimentation has shown that anode flat wire produced from nickel 200/201 with a thickness of 0.005–0.010 inches has sufficient strength as to be useable without a reinforcing substrate when spanning flow ribs with a span of 0.060–0.090 inches in fuel cell stacks with axial compressive loads of 15–20 PSI. Thus eliminating an expensive and environmentally unsound practice of electroplating stronger stainless steel alloys with nickel for corrosion protection.

Figure 2:
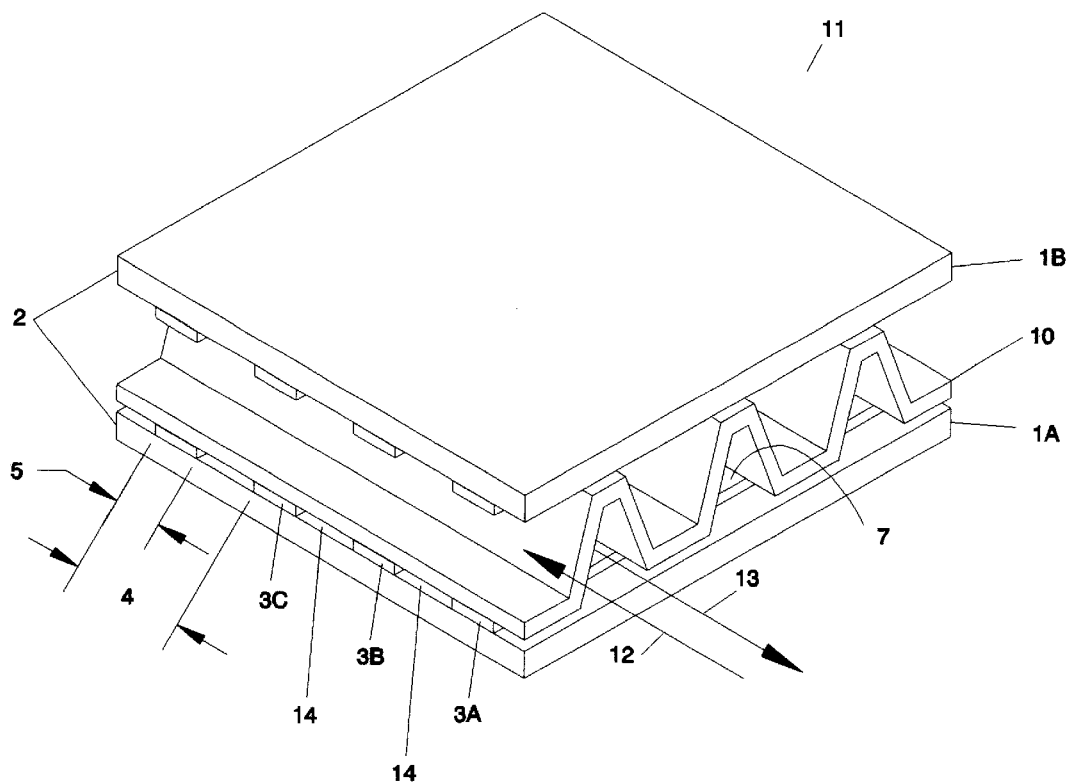
FIG. 2 illustrates a portion of the central active area of the separator/current collector/electrode assembly.

In FIG. 2 the current collector/anode electrode sub-assembly 1A and the current collector/cathode electrode sub-assembly 1B are shown with the ribbed separator 10 to form an assembly 11. An adhesive 7 is applied to the surfaces of sub-assemblies 1A and 1B to facilitate the assembly to the ribbed separator 10. As can be seen, the flat wires 3A, 3B, 3C, . . . of both the anode assembly 1A and the cathode assembly 1B are parallel to one another and are not parallel to the flow ribs of the separator 10. A conduit 14 is created in the space between each flat wire 3A, 3B, 3C . . . which provides fluid communication between adjacent ribs of the ribbed separator 10. It will be apparent to those skilled in the art that the pitch 4 and the width 5 of the flat wire current collector 3A, 3B, 3C . . . may be altered to varying degrees to adjust for optimum mechanical support for, and optimum access of reactant gasses 12 and 13 to, the electrodes 2. Experimentation has shown that a pitch 4 of 0.025–0.045 inches and a width 5 of 0.025–0.045 inches provides good support to the electrodes 2A and 2B as well as good access of reactant gasses. This combination of dimensions results generally in an open area of the current collector of about 50% but may be varied to a wide range. For example the anode flat wire current collector pitch and width may be altered to provide an open area of perhaps 35% to provide greater support to the anode electrode while maintaining sufficient open area due to the greater ease of the hydrogen fuel to access the catalytic reaction site of the porous anode electrode. Conversely, the well known molecular mass transport issues associated with the cathode and the oxidant gas may give cause to adjust pitch and width of the cathode flat wire current collector to that which would yield an increase in percentage of open area.

Figure 3:
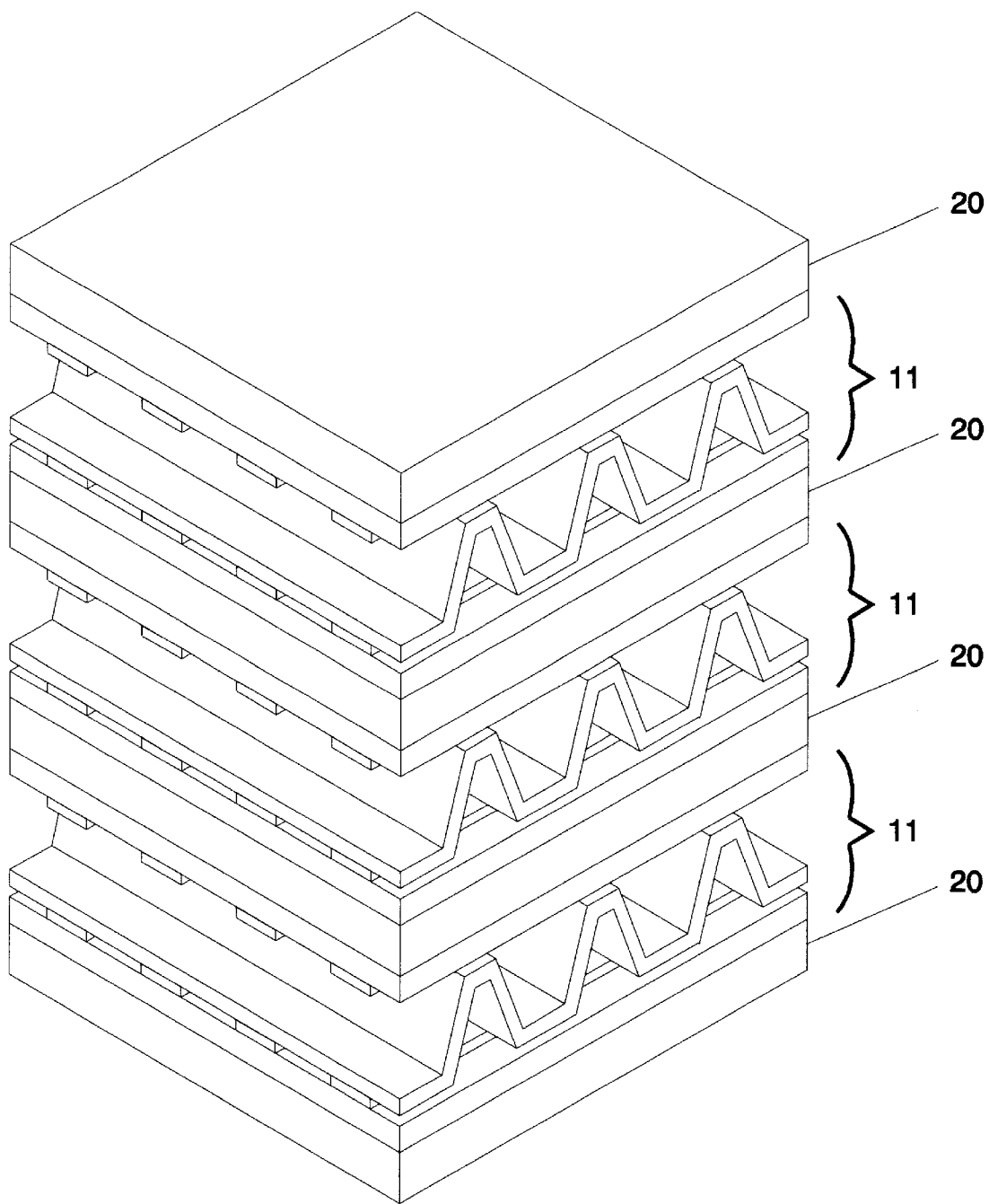
FIG. 3 illustrates a portion of the central active area of a plurality of assemblies to form a fuel cell stack.

FIG. 3 shows a plurality of assemblies 11 disposed between a plurality of electrolyte holding members 20 to form a portion of the central active area of a fuel cell stack.

Figure 4:
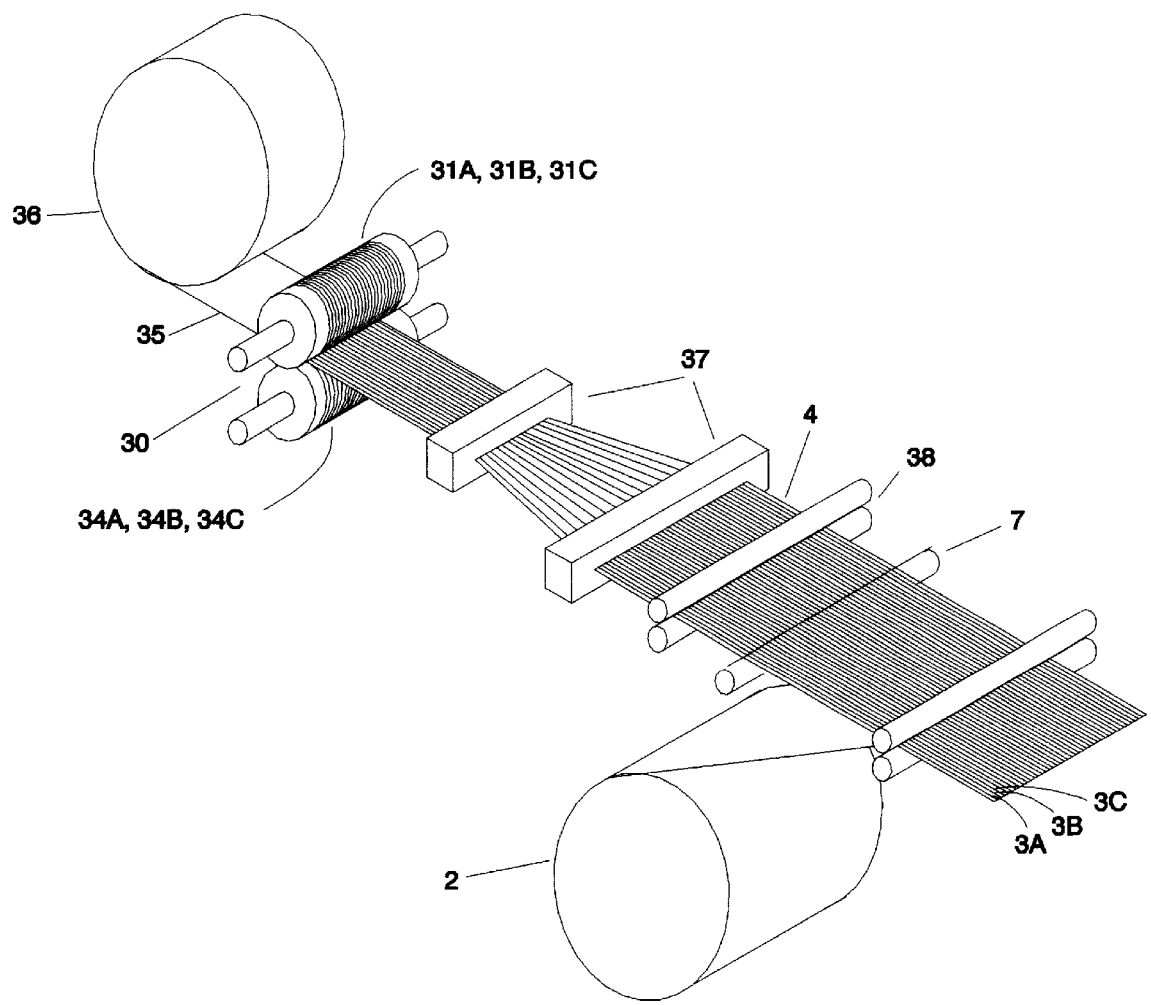
FIG. 4 illustrates the preferred manufacturing method for the invention.

FIG. 4 illustrates a preferred method of manufacture for the flat wire current collector 3A, 3B, 3C, . . . as well as a preferred method of joining to the electrode 2. A power rotary slitter 30 is provided with a plurality of discs 31A, 31B, 31C, . . . and 34A, 34B, 34C, . . . fitted to opposing and counter rotating shafts 32, 33. The discs 31A, 31B, 31C, . . . are of the appropriate diameter and thickness as to engage the discs 34A, 34B, 34C, . . . with sufficient precision and strength as to slit the sheet metal 35 dispensed from coil 36 to form flat wires 3A, 3B, 3C, . . . The thickness of the sheet metal 35 is equal to the desired thickness of the flat wire and, as has been stated, ranges from approximately 0.005 inches to approximately 0.010 inches. The flat wire is fed to a combing device 37 and spread to the desired pitch 4. A set of tensioning rolls 38 are positioned to prepare the flat wire for application of adhesive 7 and subsequent bonding to the continuously tape cast electrode 2. Those skilled in the art will be aware that high volume production of flat wire by conventional wire forming methods results in degrees of precision unnecessary for the fuel cell application. A tolerance of +/−0.0002 inches is more than sufficient for fuel cell applications and is approximately the generally accepted tolerance for cold rolled fine gauge stainless steel sheet. A tolerance of +/−0.00002 inches is the generally accepted tolerance for precision wire forming. So while it is technically feasible to produce the flat wire current collector with conventional wire forming technologies it is economically prohibitive to use any method other than slitting of sheet metal. Furthermore, while it is feasible to gang spools of pre-slit flat wire and dispense to the combing device for joining to the electrode, it is perhaps simpler to gang the slitters. An alternative to the application of the adhesive as shown may be the utilization of sheet metal with pre-applied thermal-sensitive adhesive. Those skilled in the art will see that the simplified method of manufacture of the flat wire current collector will result in little to no scrap relative to the various perforated sheet metal patterns from the prior art. Additionally, those skilled in the art will see that the combination of elimination of scrap and the spreading of the flat wire to the desired pitch during manufacture essentially results in 200% utilization of the material used to produce the current collector. In essence, a two piece separator is realized . . . one-half of a piece for the anode current collector, one piece for the ribbed separator, and one-half of a piece for the cathode current collector. Thus, reduction of material content is achieved.

Figure 5:
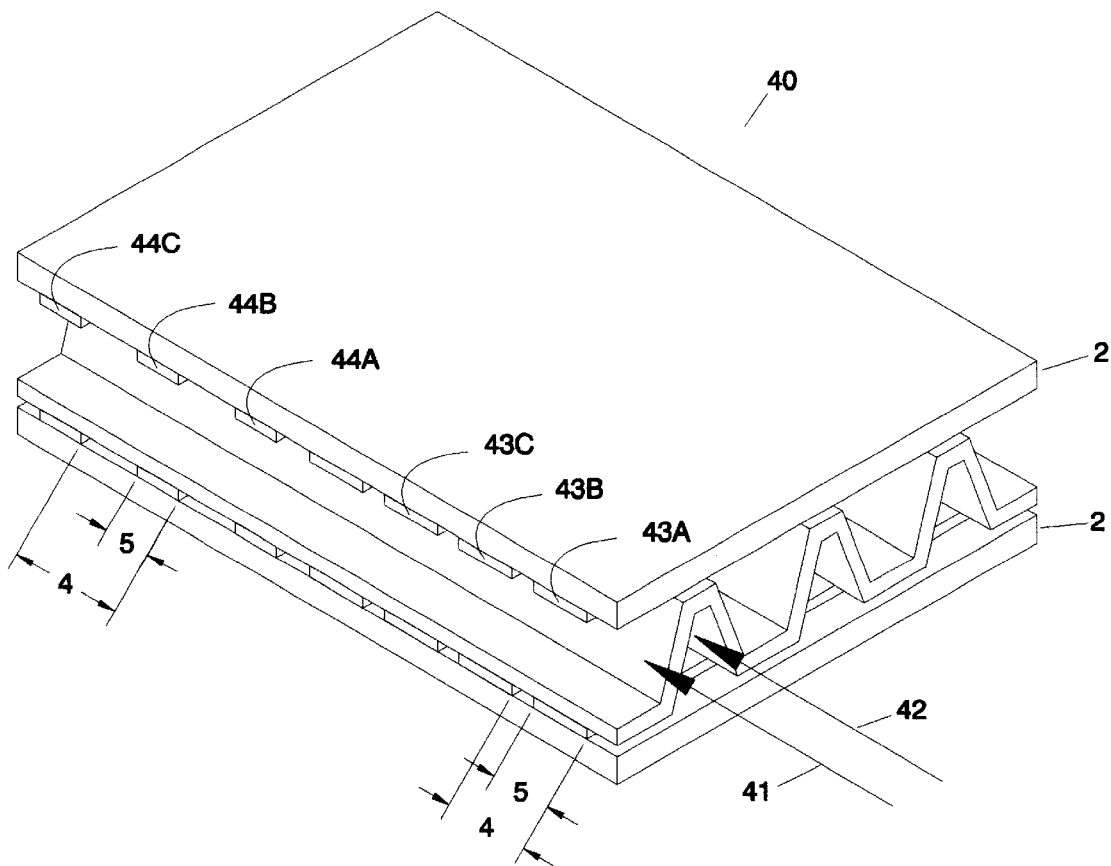
FIG. 5 illustrates the invention manipulated to selectively concentrate or disperse the electrochemical fuel cell reaction.

FIG. 5 illustrates how the invention may be manipulated to selectively concentrate or disperse the fuel cell electrochemical reaction. A fuel cell assembly 40 is shown with a ribbed separator. The anode flow 41 and the cathode flow 42 are co-flow, or co-current. The pitch 4 and the width 5 of the initial flat wires 43A, 43B, 43C, . . . at the entrance to the fuel cell are varied in width and spacing relative to the flat wires 44A, 44B, 44C, . . . at the exit of the fuel cell. The effect of the variation in pitch 4 and width 5 is to selectively shield the electrodes 2 from the reactants 41, 42 at a point when the concentrations of fuel and oxidant are at their highest in the fuel cell entrance. Similarly, at the exit the pitch 4 and width 5 combine to open the electrodes 2 to the reactants 41, 42 at a point when the concentrations of fuel and oxidant are at their lowest in the fuel cell exit, the net effect being to distribute the electrochemical reaction for more evenly distributed power generation. Similar techniques are applicable for counter-flow separators as well as cross-flow separators utilizing two independently formed flow field plates as discussed in the prior art.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A current collector, for location between an electrode and a ribbed separator of a fuel cell of a fuel cell stack having a plurality of separators, a plurality of electrodes, and a means of supplying reactants between each electrode and separator comprising:

a plurality of flat metallic wires having a planar surface contactable with an electrode, said plurality of flat metallic wires having an opposing planar surface contactable with a ribbed separator, said plurality of flat metallic wires are bonded to said electrode with an adhesive.

2. A current collector in accordance with claim 1 wherein:

each flat metallic wire is parallel to adjacent flat metallic wires.

3. A current collector in accordance with claim 1 wherein:

said plurality of flat metallic wires are not parallel to ribs of said ribbed separator.

4. A current collector in accordance with claim 1 wherein:

said plurality of flat metallic wires are coincident or are noncoincident with flat metallic wires of adjacent fuel cells.

5. A current collector in accordance with claim 1 wherein:

said plurality of flat metallic wires provide support to the extent of their lengths and widths to the electrode.

6. A current collector in accordance with claim 1 wherein:

said plurality of flat metallic wires are continuously and simultaneously slit from sheet metal.

7. A current collector in accordance with claim 1 wherein:

said plurality of flat metallic wires possess a pitch and width configured to suppress or enhance the fuel cell electrochemical reaction.

8. A current collector, for location between an electrode and a ribbed separator of a fuel cell of a fuel cell stack having a plurality of separators, a plurality of electrodes, and a means of supplying reactants between each electrode and separator comprising:
- a plurality of flat metallic wires having a planar surface contactable with an electrode,
- said plurality of flat metallic wires having an opposing planar surface contactable with a ribbed separator, said plurality of flat metallic wires provides for lateral fluid communication between adjacent flow ribs of said separator.

9. A current collector in accordance with claim 8 wherein:
- each flat metallic wire is parallel to adjacent flat metallic wires.

10. A current collector in accordance with claim 8 wherein:
- said plurality of flat metallic wires are not parallel to ribs of said ribbed separator.

11. A current collector in accordance with claim 8 wherein:
- said plurality of flat metallic wires are coincident or are not coincident with flat metallic wires of adjacent fuel cells.

12. A current collector in accordance with claim 8 wherein:
- said plurality of flat metallic wires provide support to the extent of their lengths and widths to the electrode.

13. A current collector in accordance with claim 8 wherein:
- said plurality of flat metallic wires are continuously and simultaneously slit from sheet metal.

14. A current collector in accordance with claim 8 wherein:
- said plurality of flat metallic wires possess a pitch and width configured to suppress or enhance the fuel cell electrochemical reaction.

15. A subassembly for use with a fuel cell comprising
- a cathode,
- a plurality of metallic cathode current collectors bonded to the cathode with an adhesive,
- an anode,
- a plurality of metallic anode current collectors bonded to the anode with an adhesive, and
- a separator contacting the plurality of metallic cathode current collectors and the plurality of metallic anode current collectors.

16. The subassembly of claim 15 wherein the cathode current collectors comprise flat metallic wires.

17. The subassembly of claim 15 wherein the anode current collectors comprise flat metallic wires.

18. The subassembly of claim 15 wherein the separator comprises ribs which form flow fields.

19. The subassembly of claim 15 including flow paths for lateral fluid communication between adjacent ribs.

20. A subassembly for use with a fuel cell comprising
- a cathode,
- a plurality of metallic cathode current collectors contacting the cathode,
- an anode,
- a plurality of metallic anode current collectors contacting the anode, and
- a separator including adjacent ribs contacting the plurality of metallic cathode current collectors and the metallic cathode current collectors providing for lateral fluid communication between the adjacent ribs contacting the plurality of metallic cathode current collectors and including adjacent ribs contacting the plurality of metallic anode current collectors and the metallic anode current collectors providing for lateral fluid communication between the adjacent ribs contacting the plurality of metallic anode current collectors.

21. The subassembly of claim 20 wherein the cathode current collectors comprise flat metallic wires.

22. The subassembly of claim 20 wherein the anode current collectors comprise flat metallic wires.

23. A fuel cell stack comprising a plurality of subassemblies, each subassembly comprising
- a cathode,
- a plurality of metallic cathode current collectors bonded to the cathode with an adhesive,
- an anode,
- a plurality of metallic anode current collectors bonded to the anode with an adhesive, and
- a separator contacting the plurality of metallic cathode current collectors and the plurality of metallic anode current collectors, and
- a plurality of electrolyte holding members disposed between the subassemblies.

24. The fuel cell stack of claim 23 wherein the cathode current collectors comprise flat metallic wires.

25. The fuel cell stack of claim 23 wherein the anode current collectors comprise flat metallic wires.

26. The fuel cell stack of claim 23 wherein the separator comprises ribs which form flow fields.

27. The fuel cell stack of claim 23 including flow paths for lateral fluid communication between adjacent ribs.

* * * * *